Patented Aug. 8, 1939

2,169,055

UNITED STATES PATENT OFFICE

2,169,055

PERFUME FIXATIVE

Ellsworth Byron Overshiner, Chicago, Ill., assignor, by mesne assignments, to Shellmar Products Company, Mount Vernon, Ohio, a corporation of Delaware No Drawing. Application March 29, 1937, Serial No. 133,657

2 Claims. (Cl. 167—94)

The present invention relates to an improved type of scented article which will allow escape of odoriferous substances over an extended period of time and to the process of making such articles.

A principal object of the invention is the provision of a semi-permanent fixative for various types of odors.

An additional object is to provide a perfume fixative wherein a scent-imparting material is interiorly combined with a compatible substance of such fine cellular structure or retentive capacity as to retard the escape of odors.

Still another object is the provision of a perfume fixative consisting of a cellulose article produced from a solution of a cellulose compound such as cellulose acetate or cellulose nitrate, the cellulose compound having combined with it a compatible scent-imparting material which will escape from the formed cellulose article over an extended period of time.

A further object is the combination of a plastic material of the type described and a scent-imparting essential oil.

A still further object is the provision of a method of forming scented articles, which includes producing a solution of a cellulose compound in an organic solvent, adding a scent-imparting essential oil to the solution, forming the cellulose compound into an article of the desired shape, and removing the solvent to leave the essential oil combined in the body of the cellulose compound.

These and other objects will be evident upon a consideration of the following description of a preferred embodiment of the invention.

Ordinarily, perfumes for personal use are produced by providing an alcohol solution of an essential oil. These essential oils also are combined variously to produce sachet bags, pads, powder, and the like. Sachets are used in drawers, closets, and the like, for imparting the desired odor over a period of time. The bulkiness, quick escape of odors and other factors are objections to the previously known products of this type.

In accordance with the present invention odoriferous materials are interiorly combined with a composition which will allow its escape in a particularly desirable manner. For purposes of explanation, the invention will be described herein with reference to the use of a preferred composition, cellulose acetate.

An initial step in the process comprises forming a cellulose acetate solution. This may be done by adding cellulose acetate flakes to an organic solvent such as acetone. A suitable solvent may be made by mixing 90 per cent acetone and 10 per cent of 1,4 diethylene oxide. Solvent mixtures for cellulose acetate are well known and require no further description. Preferably, a sufficient quantity of cellulose acetate flakes is added to the solvent mixture to produce a thick solution of relatively high viscosity but which may be poured or worked as desired.

To the solution of cellulose acetate there is added a suitable plasticizer. The amount of the plasticizer may vary widely, depending upon the quality which it was desired to impart to the finished article. Diethyl phthalate comprises a suitable plasticizer and may be used in widely varying amounts. For example, 2 per cent by volume of the plasticizer may be employed or if more of a plasticizing effect is desirable 20 per cent may be added to the solution. Mixtures of different plasticizers may be utilized. An equal mixture of diethyl phthalate and tri-acetic acid ester of glycerine has been found desirable as a plasticizer for the cellulose acetate solution.

In some cases the above mixture has a tendency to develop a "blush" or to turn white when cast into sheet form and to retard this I prefer to employ a small quantity of a material such as diacetone, the action of which apparently is the prevention of absorption of moisture. By way of example, 1 to 5 per cent or more by volume of diacetone may be mixed with the cellulose acetate solution before the latter is formed into sheets.

The cellulose acetate solution is of such character as to permit the formation of sheets, films or the like by pouring the solution in a suitable manner and allowing it to dry or set up with the loss of solvent. Before the cellulose acetate solution is cast there is added to it a compatible scenting agency such as the essential oils of various flowers or synthetic elements. These oils are soluble in the cellulose acetate solution and may even act as plasticizers for the sheet or film into which the cellulose acetate subsequently is formed. It will be understood that the amount of the essential oil employed in the solution may vary widely depending upon the particular odor imparted by the oil and the results desired. As an example of one satisfactory method of producing the desired material, an amount of essential oil having the characteristic of giving off the odor of lavender may be employed in the proportion of one drop of the oil to a film shaped to simulate a leaf of 2 inches width and 4 inches length. The essential oils having the odors of gardenia, tea rose, violet, honeysuckle, rose, jasmine, narcissus, lilac, and the like, also may be utilized in the manner described. Essential oils or synthetics having tree odors of cedar or pine may be employed. Other compatible scented materials may be used in the same manner.

After mixture of the scented material with the cellulose acetate solution the solution is cast or otherwise shaped into films, sheets, or the like, and allowed to dry. The solvents by which the cellulose acetate is maintained in solution evaporate, leaving a composite article of durable form. In drying, the cellulose acetate sets up as a film of very small cellular structure and the perfume material is interiorly incorporated in the film in such a manner as to permit escape at a slow rate. That is, the essential oils are bound into an integral mass with the cellulose acetate, thereby preventing rapid escape. It will be found that the cellulose acetate film will give off the incorporated odor even after months of use. Thus, a small portion of the cellulose acetate film of leaf-like size is effective to impart the desired odor to a closet, drawers, or the like, for many months.

In one embodiment of the invention the cellulose acetate solution prepared in the manner described is poured onto a glass plate having matrices simulating a leaf. The matrices may be etched from the face of the glass to a depth sufficient to provide a thin leaf-like film when the solvent has evaporated. Any surplus may be wiped from the face of the glass and the solvent is allowed to evaporate from the poured or cast solution. It is preferred to retard the rate of evaporation of the solvent sufficiently to insure the formation of a clear film free from such imperfections such as bubbles. This may be accomplished by stacking a number of the glass plates in superposed relation with a slight spacing therebetween.

The matrix in which the leaves are formed preferably is provided with the depressed portions simulating the veins or stem portions of a leaf. In addition to adding to the attractiveness of the leaves, these portions have a strength-imparting characteristic which tends to retard curling tendency.

Another method of forming the solution into the desired articles consists in producing from the cellulose acetate solution a continuous scented film or sheet. Thereafter, the sheet may be embossed or stamped into small sections which may simulate a leaf or the like. The waste from this procedure may be put back into solution and again processed.

The appearance of the scented article desirably is enhanced by adding an appropriate coloring agent to the acetate solution before the pouring operation. The coloring agent may be any suitable alcohol-soluble dye. Where a leaf is simulated a green color may be employed, or if it is desired to simulate a dead leaf autumn colors may be used.

When the cellulose acetate has set into an integral mass in which the scent-imparting essential oils are mechanically incorporated in a semi-permanent manner, the resulting article is a particularly effective perfuming agent. The nature of the cellulose acetate is such that the essential oils which are incorporated in it do not have a tendency to migrate or separate but will escape from the acetate at a rate sufficient to provide a lasting odor. A particular advantage of the scented film produced in the manner described is that a relatively small piece of the film will act as an effective perfuming agent with substantial longevity. The film-like construction of the leaves or other perfumed articles renders them well suited for use in many closed receptacles. Cigarette containers, wardrobes, chests, bags, and the like, may have imparted thereto any desired fragment odor for a maximum period by use of the scent-impregnated cellulose fixative.

The structure of the fixative material effectively maintains the essential oils against rapid release. Various substances of the type described may vary in their physical and chemical structure. For example, cellulose nitrate seems to have more of a fixative capacity than does cellulose acetate. Other plastic materials will have their own individual fixative capacities, depending upon their chemical and physical structure. The amount and nature of the scent and the results desired will determine the best material for use in the manner described. Gelatin or protein gums of suitable nature may be employed for incorporating the odor-imparting substances by forming a solution of the odoriferous materials with the material from which the film is to be formed and thereafter forming the film without separation of the odor-imparting materials. The non-fibrous nature of such substances presents a minimum of surface area for escape of the scent-imparting materials.

It will be recognized from the description given herein for purposes of explanation that the process and product may be varied considerably without departing from the scope of the appended claims.

I claim:

1. A perfume fixative, comprising a non-fibrous pellicle of cellulose acetate containing an essential oil and a plasticizer composed of diethyl phthalate and tri-acetic acid ester of glycerine.

2. A sheet of non-fibrous perfume fixative comprising a dried pellicle of cellulose acetate containing an essential oil, diethyl phthalate and diacetone.

ELLSWORTH BYRON OVERSHINER.